Oct. 10, 1939. L. WERTHEIMER 2,175,332
COFFEE URN
Filed Feb. 25, 1938 2 Sheets-Sheet 1

Inventor
LEO WERTHEIMER
by J. W. McEllis
Attorney

Oct. 10, 1939.  L. WERTHEIMER  2,175,332
COFFEE URN
Filed Feb. 25, 1938  2 Sheets-Sheet 2
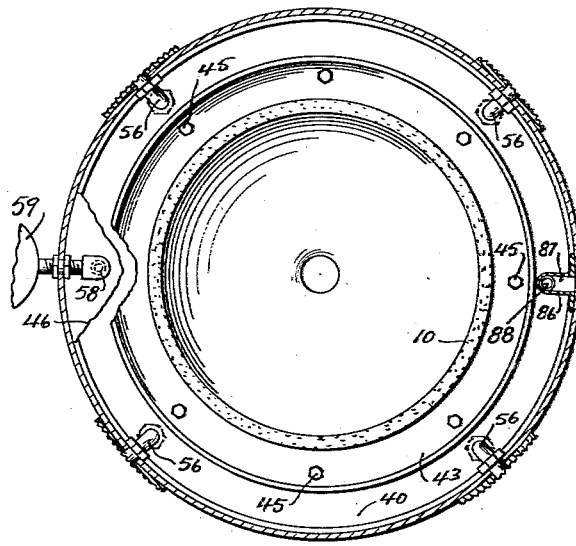
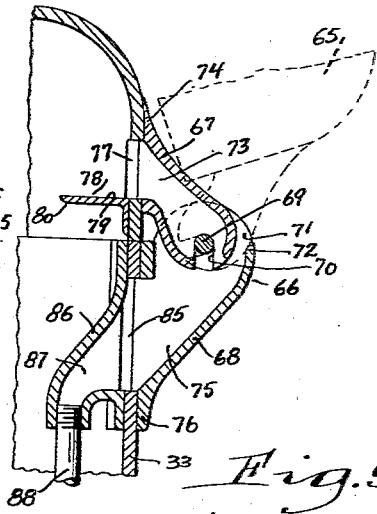
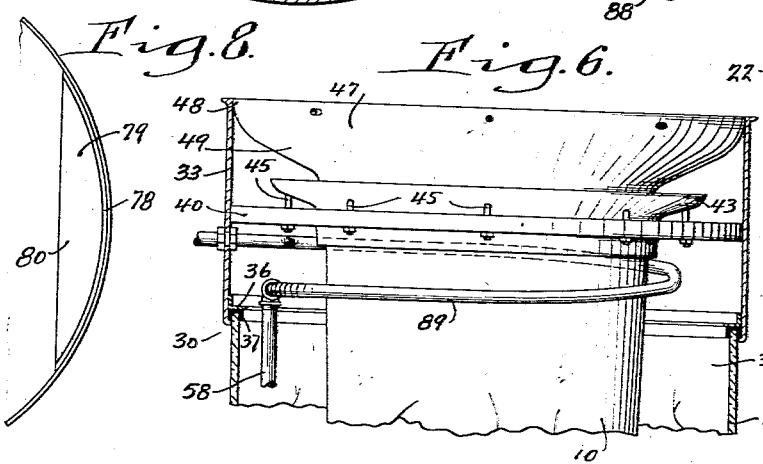
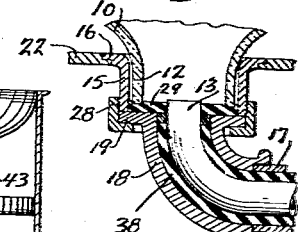
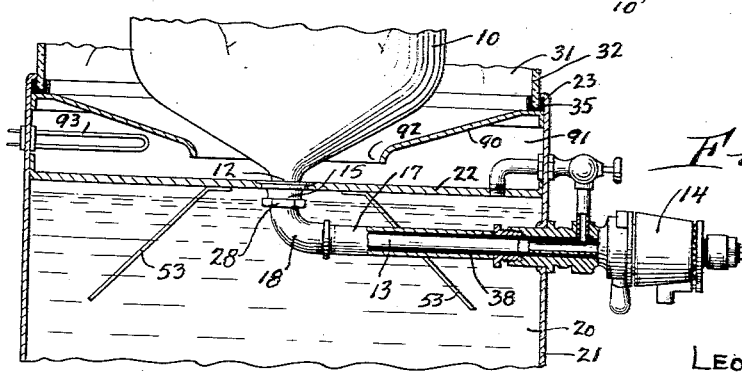
Inventor
LEO WERTHEIMER
by J. W. m. Ellis
Attorney Patented Oct. 10, 1939

2,175,332

UNITED STATES PATENT OFFICE 2,175,332

COFFEE URN

Leo Wertheimer, Buffalo, N. Y., assignor to Amcoin Corporation, Buffalo, N. Y., a corporation of New York Application February 25, 1938, Serial No. 192,508

9 Claims. (Cl. 53—3)

It is well known to those skilled in the art that in the coffee urns of the present day, the boiler thereof surrounds a large portion of the coffee container or liner which is usually of glass and the only place where the coffee can be seen is in the coffee gauge. Furthermore, it is well known that when the cover of the urn is opened, the condensation on the inner surfaces thereof will run down to the lower edge of the cover and then into the top of the coffee container or the leecher.

It has been a principal object of my invention to provide a coffee urn with a portion of the outer jacket made of glass so that the coffee in the container may be visible from the exterior of the device.

Another object has been to provide a heating chamber around the outside of the container and between the container and the outer jacket.

Moreover, it has been another object to provide a seal arranged at the top of the heating chamber and surrounding the glass container, whereby the chamber is made air-tight and water-tight.

Another object has been to provide a structure in which the container may be removed and replaced, in the case of breakage, in simple, convenient, and inexpensive manner.

Furthermore, my invention contemplates the use of a boiler arranged below the coffee container.

Moreover, the cover of my urn is attached to the jacket thereof by means of a hinge, the parts of which are provided with passageways connecting them to a drain pipe.

The above objects and advantages have been accomplished by the device shown in the accompanying drawings, of which:

Fig. 4 is a sectional view of the device taken on line 4—4 of Fig. 2, with the flange ring removed.

Fig. 5 is an enlarged view showing the cover hinge.

Fig. 6 is a fragmentary, sectional view showing a modified form of means for heating the chamber.

Fig. 7 is a similar view showing still another form of chamber heating means.

Fig. 8 is a fragmentary, interior view of the cover, showing the segmental plate.

Fig. 9 is an enlarged, fragmentary, sectional view of the container and outlet connection.

Figures 1, 2, 3:
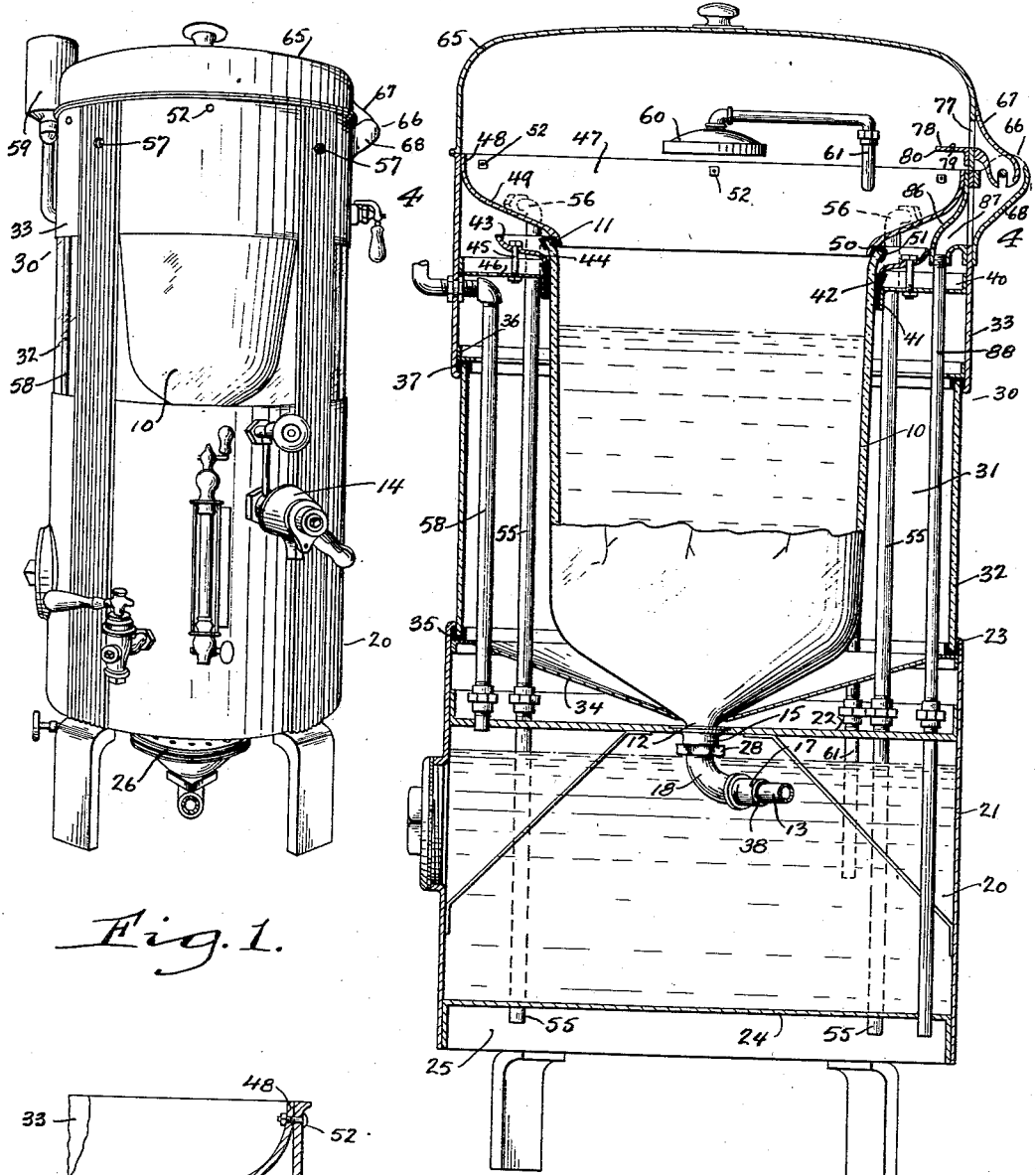
Fig. 1 is an exterior view of my complete device.
Fig. 2 is an enlarged, fragmentary, sectional view taken through the center of my device.
Fig. 3 is an enlarged, fragmentary, sectional view showing the means for sealing the upper end of the coffee container.

My device comprises a coffee container or liner 10 which is made of glass and provided with an open top formed by the edge 11, and with an outlet neck 12. An outlet pipe 13 is connected with the outlet neck, and the outer end of this pipe extends to and is connected with the dispensing faucet 14 of well known type. The neck of the container extends preferably through the top 22 of the boiler and into a sleeve 15. This sleeve is formed with an annular flange 16 which is secured to the boiler top preferably by means of soldering. A sheath or protecting pipe 17 is provided which is formed with an elbow portion 18 and which conforms substantially to the shape of the outlet pipe 13. The elbow portion 18 is provided with an annular flange 19 which bears against the bottom of the sleeve 15 and which is secured thereto by means of a union connection 28. This union connection is screwthreaded to the sleeve 15 and serves to clamp the flange 19 tightly against the sleeve. A resilient gasket 29, preferably of soft rubber, is arranged within the sleeve and rests upon the upper exposed portions of the annular flange 19. An aperture is provided in this gasket for the reception of the upwardly extending end of the outlet pipe 13. The parts are so proportioned that the neck 12 will rest upon the gasket 29, thereby forming an efficient seal and making all parts fluid-tight. The container is held in place by means of a flange arranged at the upper end, to be hereinafter described. The opening in the sheath 17 is considerably larger than the outlet pipe 13, and a filler 38, preferably of rubber tubing, surrounds the pipe and fills this space so as to resiliently hold the outlet pipe in place. The tubular filling 39 preferably does not extend to the upper surface of the annular flange 19 of the elbow portion 18 of the sheath and the space between this end and the bottom surface of the gasket 29 is filled with any suitable plastic material 39 which hardens and seals all the joints and makes them fluid-tight. Since the entire weight of the coffee container with its contents is taken by the sleeve 15, it is advisable to brace the boiler top 22 at this point, and this is done by means of a plurality of braces 53.

With this arrangement, it is obvious that should breakage occur in the liner or repairs become necessary, it is a very simple matter to remove the liner and replace it by another one by lifting it out of the urn after the clamping members, to be hereinafter described, are removed. Arranged below the container 10 is the boiler 20 of my device. This boiler is relatively short and is formed by an outer casing 21, which is closed at the upper end by a head 22, and at its lower end by a head or bottom 24. The upper head 22 is preferably arranged just below the coffee container 10, and some distance below the upper edge 23 of the outer jacket. The bottom head 24 is arranged some distance above the lower edge of the jacket, whereby a heating chamber 25 is provided. Arranged beneath this chamber is the heating element 26 of my device, which may be a gas burner, as shown, or any other suitable source of heat.

An urn jacket 30 is arranged about the coffee container and in interspaced relation therewith, whereby a heating chamber 31 is provided. The jacket 30 is composed of a lower portion 32 of glass or other suitable transparent material, and an upper portion 33 of metal. The lower edge of the lower portion 32 is disposed within the upper edge 23 of the boiler jacket and rests upon the annular edge of a shield 34 secured to the jacket and extending preferably inwardly toward the center and below the liner 10. A gasket 35 of suitable resilient material is placed about the lower edge of the lower portion 32 of the jacket, whereby it is sealed at this point. The upper portion 33 of the jacket is provided with a supporting ring 36 of angular cross-section, secured thereto, which rests upon a gasket 37 provided at the upper edge of the lower portion 32 of the jacket.

The upper end of the container 10 is supported in the upper portion 33 of the jacket. A Z-shaped ring 40 is secured to the upper portion of the jacket and the inner downwardly extending flange 41 thereof is so proportioned as to provide some space between it and the outside of the container 10. A resilient gasket 42 is placed within the space between the member 41 and the container, and a gland ring 43 is provided for forcing the gasket 42 into place. This ring is provided with a downwardly extending flange 44, and a plurality of bolts 45 pass through the ring and through the horizontal member 46 of the Z-shaped ring 40 and provide means for forcing the gland ring downwardly to move the packing to and hold it in position. Arranged above the container and all of the parts just described, is a flange ring 47 which covers the upper edge of the container and all unsightly parts in the upper interior of the urn, thereby giving a neat appearance. This ring also prevents anything from being spilled in the space above the Z-shaped member 40 and between the jacket and the container. This ring has an upturned flange 48 engaging with the inner wall of the upper portion 33 of the jacket and terminating preferably at the upper end thereof. This ring has an annular wall 49 which slopes downwardly and inwardly and at the inner edge of which is a downwardly extending flange 50. The wall 49 of this ring flange is joined to the upturned flange 48 and the downwardly extending flange 50 by smooth curved surfaces so that all such surfaces drain toward the container and may easily be kept clean. This flange is so formed as to fit about a gasket 51 arranged around the top edge 11 of the container. This ring is preferably fastened in place by means of bolts 52 and serves to hold the container down in place and to keep the neck 12 thereof in contact with its gasket 29, thereby creating a water-tight joint.

From the foregoing it will be seen that the space 31 surrounding the container is enclosed by the two portions 32 and 33 of the jacket 30, the Z-shaped member 40 at the upper end, and the boiler top 22 at its lower end. In order to maintain the coffee in the container at the proper temperature, it is desirable to provide some means for heating this space 31. This may be accomplished in a number of ways, as shown in the drawings, and the means employed in the form of Figs. 1 and 2 comprise a plurality of hot air pipes 55. These pipes extend down through the boiler 20 and have their lower ends exposed within the heating space 25 below the same. They extend through the space 31 and through the Z-shaped member 40 carried by the upper portion 33 of the jacket. Each of these pipes is provided at its upper end with an elbow 56 by which it is secured to the jacket part 33. An opening 57 is formed in the jacket opposite each of the elbows, whereby a vent is provided for each of the heating pipes. It will be seen that the heat produced by the burner 26, or other heating means used for the boiler, will pass up through the pipes 55 and thus heat will be radiated from these pipes into the space 31 and maintain the desired temperature within the space.

A steam pipe 58 extends from the boiler upwardly through the space 31 and is connected on the outside, after passing through the upper portion 33 of the jacket, to a safety valve 59. My urn is also provided with the usual spray and filter screen 60 which is connected to the boiler by means of pipes 61 in the customary manner.

My urn is provided with a cover 65 which is pivotally secured to the jacket 30 by means of a hinge 66. This hinge comprises an upper part 67 and a lower part 68. The lower hinge part 68 is provided with a pivot pin 69 with which the upper part 67 is engageable. It is preferable to form the upper part with a slot 70, whereby the cover may be easily detached from the casing if desired. The upper part fits into a slot 71 and the wall of the lower part is extended upwardly to form a stop 72, whereby the upper part of the hinge and the attached cover is limited in its rearward movement when the cover is open. The upper hinge part 67 is provided throughout its length with a passageway 73 which extends through the flange 74 which secures it to the cover, and the lower hinge member 68 is likewise provided with a passageway 75 which extends through the flange 76. As shown in Fig. 5, these passageways extend to the engaging ends of the hinge members so that they are in communication with each other. An opening 77 is formed in the cover opposite the passageway 73 and a segmental plate 78 is secured to the cover and has the face 79 of its flange 80 substantially in line with the bottom of the opening 77. This plate extends some distance above the inner periphery of the cover and across from one side of the cover to the other, as shown in Fig. 8, thus forming a baffle or wier to prevent condensation from reaching the edge of the cover when the cover is in its substantially vertical position, as shown by the dotted lines in Fig. 5. The upper metallic casing member 33 is provided with an opening 85 opposite the passageway 75 in the lower hinge member 68. A drain pipe fixture 86 is secured to the inside of the upper jacket part 33 and immediately opposite the opening 85. This fixture is formed with a passageway 87, and connected thereto is a drain pipe 88. This drain pipe is extended downwardly, as shown in Fig. 2, to the bottom of the boiler where the condensation coming therethrough is suitably conducted away.

In the modified form shown in Fig. 6, I utilize steam to heat the chamber 31. In this form, the steam pipe 58, instead of going directly to the safety valve 59, as in the form of Fig. 1, is connected to a loop or coil 89. This coil is provided with one or two turns which encircle the upper end of the container and thus serve to heat the chamber 31.

Still another form of means for heating the chamber 31 is illustrated in Fig. 7. In this form a shield 90 is provided, which is arranged near the bottom of the container 10 and is interspaced with relation to the top 22 of the boiler, whereby a chamber 91 is formed. The shield is provided at its center with an enlarged opening 92, and an electrical heating unit 93 of any suitable type is located in the chamber 91. The air thus heated in the chamber 91 will pass up through the opening 92 and serve to heat the air within the chamber.

From the foregoing it will be obvious that the coffee in the container 10 will be readily visible through the lower glass part 32 of the outer jacket. The coffee will be kept hot by means of the heated air within the space 31 and surrounding the container, either through the medium of the heating pipes 55, the steam coil 89, or the electrical heating unit 93. It will, furthermore, be obvious that, since the air space 31 is substantially sealed, no moisture, gas fumes, or foreign matter can get into this space. The interior of the glass portion 32 of the jacket, as well as the exterior of the container, will thus be kept clean and transparent, thus making it possible for the customer at all times to see the contents of the beverage container.

Obviously, these and other modifications of the details herein shown and described may be made without departing from the spirit of my invention or the scope of the appended claims, and I do not, therefore, wish to be limited to the exact embodiment herein shown and described, the forms shown being merely preferred embodiments thereof.

Having thus described my invention, what I claim is:

1. A coffee urn comprising a glass container, a closed boiler below said container, a two-part jacket above the boiler and in interspaced relation with the container, thereby forming an air chamber around said container and above said boiler, the lower part of said jacket being made of glass, and the upper part thereof being made of metal, means for sealing said chamber at the upper end, comprising a resilient gasket at the upper end of the container and disposed between the jacket and the container, a gland ring arranged above the jacket for pressing the gasket to place, and heating means extending through the air chamber and closed against communication therewith, whereby the coffee is kept at proper temperature.

2. A coffee urn comprising a glass container, a closed boiler below said container, a two-part jacket above the boiler and in interspaced relation with the container, thereby forming an air chamber around said container and above said boiler, the lower part of said jacket being made of glass, and the upper part thereof being made of metal, means for sealing said chamber at the upper end, comprising a resilient gasket at the upper end of the container and disposed between the jacket and the container, a gland ring arranged above the jacket for pressing the gasket to place, a flange ring joining the upper end of the container with the upper end of the jacket, and heating means extending through the air chamber and closed against communication therewith, whereby the coffee is kept at proper temperature.

3. A coffee urn comprising a glass container, a boiler below said container, a two-part jacket above the boiler and in interspaced relation with the container, thereby forming an air chamber around said container and above said boiler, the lower part of said jacket being made of glass, and the upper part thereof being made of metal, a cover for the jacket, means for sealing the chamber at the upper and the lower ends thereof, a cover hinge having its upper part secured to the cover and its lower part secured to the upper metal part of the jacket, said hinge parts each being formed with communicating passageways, the cover and jacket being each formed with an opening leading into said passageways, a condensation drain pipe communicating with the passageways of the hinge, and heating means extending through the air chamber and closed against communication therewith, whereby the coffee is kept at proper temperature.

4. A coffee urn comprising a glass container, a boiler below said container, a two-part jacket above the boiler and in interspaced relation with the container, thereby forming an air chamber around said container and above said boiler, the lower part of said jacket being made of glass, and the upper part thereof being made of metal, a cover for the jacket, means for sealing the chamber at the upper and the lower ends thereof, a cover hinge having its upper part secured to the cover and its lower part secured to the upper metal part of the jacket, said hinge parts each being formed with communicating passageways, the cover and jacket being each formed with an opening leading into said passageways, a segmental plate secured to the inside of the cover and below the opening therein, a condensation drain pipe communicating with the passageways of the hinge, and heating means extending through the air chamber and closed against communication therewith, whereby the coffee is kept at proper temperature.

5. A coffee urn comprising a glass container, a closed boiler below said container, a two-part jacket above the boiler and in interspaced relation with the container, thereby forming an air chamber around said container and above said boiler, the lower part of said jacket being made of glass, and the upper part thereof being made of metal, means for sealing said chamber at the upper end, comprising a resilient gasket at the upper end of the container and disposed between the jacket and the container, and a gland ring arranged above the jacket for pressing the gasket to place.

6. A coffee urn comprising a glass container, a closed boiler below said container, a two-part jacket above the boiler and in interspaced relation with the container, thereby forming an air chamber around said container and above said boiler, the lower part of said jacket being made of glass, and the upper part thereof being made of metal, means for sealing said chamber at the upper end, comprising a resilient gasket at the upper end of the container and disposed between the jacket and the container, a gland ring arranged above the jacket for pressing the gasket to place, and a flange ring joining the upper end of the container with the upper end of the jacket.

7. A coffee urn comprising a glass container, a boiler below said container, a two-part jacket above the boiler and in interspaced relation with the container, thereby forming an air chamber around said container and above said boiler, the lower part of said jacket being made of glass, and the upper part thereof being made of metal, a cover for the jacket, means for sealing the chamber at the upper and the lower ends thereof, a cover hinge having its upper part secured to the cover and its lower part secured to the upper metal part of the jacket, said hinge parts each being formed with communicating passageways, the cover and jacket being each formed with an opening leading into said passageways, and a condensation drain pipe communicating with the passageways of the hinge.

8. A coffee urn comprising a glass container, a boiler below said container, a two-part jacket above the boiler and in interspaced relation with the container, thereby forming an air chamber around said container and above said boiler, the lower part of said jacket being made of glass, and the upper part thereof being made of metal, a cover for the jacket, means for sealing the chamber at the upper and the lower ends thereof, a cover hinge having its upper part secured to the cover and its lower part secured to the upper metal part of the jacket, said hinge parts each being formed with communicating passageways, the cover and jacket being each formed with an opening leading into said passageways, a segmental plate secured to the inside of the cover and below the opening therein, and a condensation drain pipe communicating with the passageways of the hinge.

9. A coffee urn comprising a glass container, a closed boiler below said container, a two-part jacket above the boiler and in interspaced relation with the container, thereby forming an air chamber around said container and above said boiler, the lower part of said jacket being made of glass, and the upper part thereof being made of metal, means for sealing said chamber at the upper end, a flange ring joining the upper end of the container with the upper end of the jacket, and heating means extending through the air chamber and closed against communication therewith, whereby the coffee is kept at proper temperature.

LEO WERTHEIMER.